(12) United States Patent
Schoch

(10) Patent No.: US 10,577,042 B2
(45) Date of Patent: Mar. 3, 2020

(54) CLAMPING DEVICE FOR HANDLEBAR

(71) Applicant: Andreas Schoch, Shanghai (CN)

(72) Inventor: Andreas Schoch, Shanghai (CN)

( * ) Notice: Subject to any disclaimer, the term of this patent is extended or adjusted under 35 U.S.C. 154(b) by 0 days.

(21) Appl. No.: 16/197,175

(22) Filed: Nov. 20, 2018

(65) Prior Publication Data

US 2019/0344853 A1 Nov. 14, 2019

(30) Foreign Application Priority Data

May 14, 2018 (CN) .......................... 2018 1 0455458

(51) Int. Cl.
*B62J 11/00* (2006.01)
*F16M 13/02* (2006.01)
*F16B 2/10* (2006.01)

(52) U.S. Cl.
CPC ............ *B62J 11/00* (2013.01); *F16M 13/022* (2013.01); *F16B 2/10* (2013.01)

(58) Field of Classification Search
CPC . B62J 11/00; B62J 2099/0033; F16M 13/022; F16B 2/10; B62K 11/14; B62K 23/06
USPC .................................................. 224/420, 448
See application file for complete search history.

(56) References Cited

U.S. PATENT DOCUMENTS

| 7,152,834 | B2* | 12/2006 | Hsu | ......................... | B62J 11/00 |
| | | | | | 248/230.1 |
| 7,780,321 | B1* | 8/2010 | Retief | ....................... | B62J 6/16 |
| | | | | | 362/474 |
| 9,346,355 | B2* | 5/2016 | Van Baar | ................ | B62K 11/14 |
| 9,402,016 | B1* | 7/2016 | Hidalgo | ................ | H04N 5/2251 |
| 9,440,703 | B2* | 9/2016 | Miki | ....................... | B62K 21/26 |
| 9,499,230 | B1* | 11/2016 | Russ | ....................... | B62K 11/14 |
| 9,651,070 | B2* | 5/2017 | Hirotomi | ................ | B62K 23/06 |
| 9,759,243 | B2* | 9/2017 | Hirotomi | ................ | B62K 23/06 |
| 2005/0092798 | A1* | 5/2005 | Borgman | ................. | B62J 11/00 |
| | | | | | 224/420 |
| 2007/0119888 | A1* | 5/2007 | Chuang | .................... | B62J 11/00 |
| | | | | | 224/427 |

(Continued)

FOREIGN PATENT DOCUMENTS

| CN | 201228045 Y | 4/2009 |
| CN | 102951227 A | 3/2013 |

(Continued)

*Primary Examiner* — Justin M Larson

(57) ABSTRACT

The present disclosure provides a clamping device for a handlebar, including: a clamping base comprising a cavity and a first clamping surface; a clamping arm pivotally connected to the clamping base and having a second clamping surface; a locking arm arranged in the cavity and pivotally connected with the clamping base, the locking arm is connected with the clamping arm and provided with at least one locking hole thereon; a locking assembly mounted on the clamping base and comprising a locking pin, and the clamping device is in a locked state when the locking pin is inserted into the locking hole; and a support component detachably mounted on the clamping base for fixing a smart equipment. The clamping device of the present disclosure can be quickly locked or released without additional tools, and no extra adjustment is needed after holding to the handlebar. The clamping device can be applied to a variety of different smart devices by replacing different support component.

20 Claims, 4 Drawing Sheets

(56) References Cited

U.S. PATENT DOCUMENTS

| | | | | |
|---|---|---|---|---|
| 2015/0165904 A1* | 6/2015 | Van Baar | ............... | B62K 11/14 |
| | | | | 74/483 R |
| 2015/0183478 A1* | 7/2015 | Tate | ......................... | B62J 11/00 |
| | | | | 224/441 |
| 2015/0286115 A1* | 10/2015 | Koch | ....................... | B62J 11/00 |
| | | | | 248/615 |

FOREIGN PATENT DOCUMENTS

| | | |
|---|---|---|
| CN | 206077485 U | 4/2017 |
| CN | 206664776 U | 11/2017 |
| DE | 20218659 U1 | 4/2003 |

\* cited by examiner

CLAMPING DEVICE FOR HANDLEBAR

FIELD OF THE INVENTION

The present disclosure is directed to a clamping device, in particular, to a clamping device for a handlebar of motorcycle or bicycle.

BACKGROUND OF THE INVENTION

With the development of smart devices, more and more users tend to fix the smart devices such as mobile phones, navigation devices and action cameras on the handlebar of the motorcycles or bicycles to increase riding safety and interest.

However, the existing clamping device for the handlebar is usually fastened on the handlebars by means of other tools such as screws, the installation and disassembly is time-consuming and it cannot be used for the handlebars with various diameters. In addition, the existing clamping device for handlebar is usually used to hold and support one kind of smart equipment. When different equipment is needed to be replaced, a different clamping device is often needed to be replaced, which leads to the increased cost of the user.

SUMMARY OF THE INVENTION

This application is aimed at overcoming the above existing defects. A clamping device for handlebar is proposed, which has fast disassembly performance and can be applied to handlebars with different diameters. Moreover, the smart equipment supported by the clamping device for handlebar can be easily replaced as required by the users.

To this end, the present disclosure provides a clamping device for a handlebar, including: a clamping base comprising a cavity and a first clamping surface; a clamping arm pivotally connected to the clamping base and having a second clamping surface; a locking arm arranged in the cavity and pivotally connected with the clamping base, the locking arm is connected with the clamping arm and provided with at least one locking hole thereon; a locking assembly mounted on the clamping base and comprising a locking pin, and the clamping device is in a locked state when the locking pin is inserted into the locking hole; and a support component detachably mounted on the clamping base for fixing a smart equipment.

According to the above conception, this disclosure can further include any one or more of the following preferred forms.

In some preferred forms, the clamping device for a handlebar also comprises a holding arm pivotally connected with the clamping arm and the locking arm.

In some preferred forms, the locking assembly comprises a locking seat mounted on the clamping base, and the locking pin is capable of moving back and forth between a locked position and an unlocked position along the perforation on the locking seat.

In some preferred forms, the locking assembly comprises an elastic element, wherein the locking pin is accommodated and locked in the locking seat and is capable of passing through the locking hole on the locking arm in the locked position, and the locking pin is elastically restored to protrude out from the locking seat in the unlocked position.

In some preferred forms, the locking pin is unlocked by means of an unlocked component.

In some preferred forms the first clamping surface and the second clamping surface are respectively provided with anti-skid components, and the anti-skid components are attached to the first clamping surface and the second clamping surface by adhesive and/or clip groove.

In some preferred forms, the anti-skid components are made of rubber.

In some preferred forms, the support component is configured to hold mobile phone, navigation system or action camera.

In some preferred forms, the clamping device is made of cast aluminum or aluminum alloy.

In some preferred forms, the surface of the clamping device is coated with color, chrome plated or black anodized.

This application has at least the following advantages:

1. the clamping device can be quickly locked or released without additional tools, and no extra adjustment is needed after holding to the handlebar;

2. the locking arm can be provided with one locking hole to fit the handlebars with same diameter or multiple locking holes to fit the handlebars with different diameters, for example, they can be applied to various handlebars with 1 inch, 1.2 inch and ⅞ inch diameter;

3. the locking pin of the locking assembly can be unlocked by pressing or unlocked by an unlocking component, and thus it also has anti-theft function if an unlocking component is provided;

4. the clamping device can be applied to a variety of different smart devices by replacing different support components.

BRIEF DESCRIPTION OF THE DRAWINGS

Other characteristics and advantages of this disclosure will be better understood through the following preferred embodiments described in detail in combination with the drawings.

DESCRIPTION OF EMBODIMENTS

Figure 1:
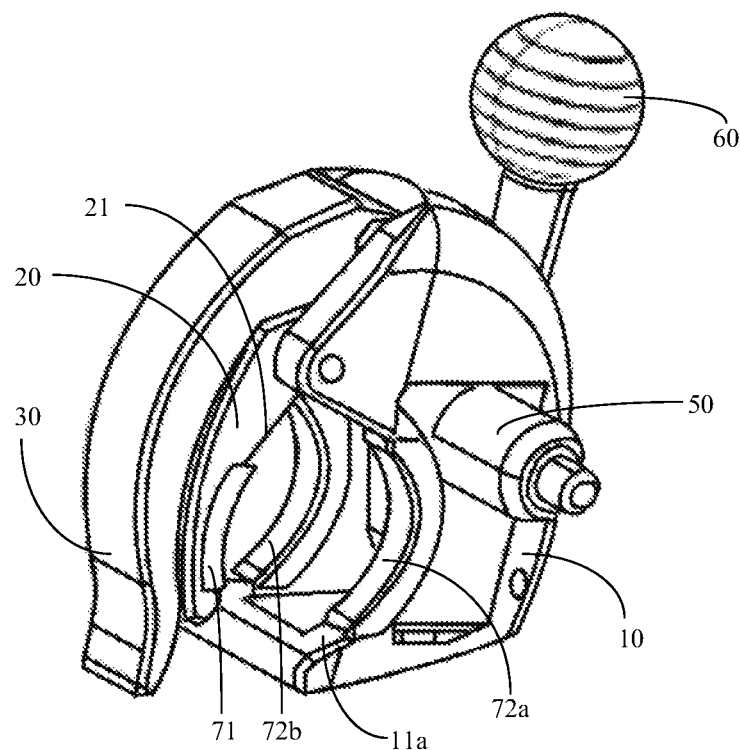
FIG. 1 is a front perspective view of a clamping device for handlebar according to a preferred embodiment of this application.
Figure 2:
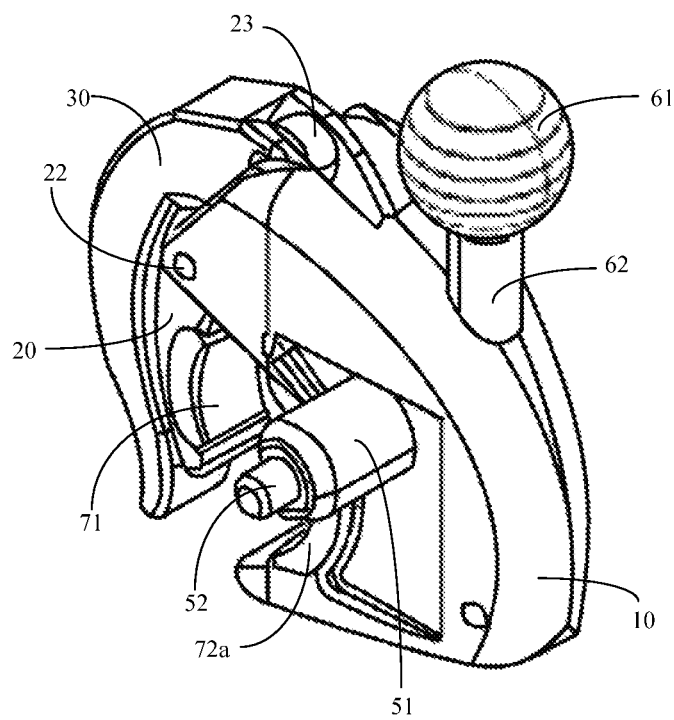
FIG. 2 is another front perspective view of the clamping device for handlebar of FIG. 1.
Figure 3:
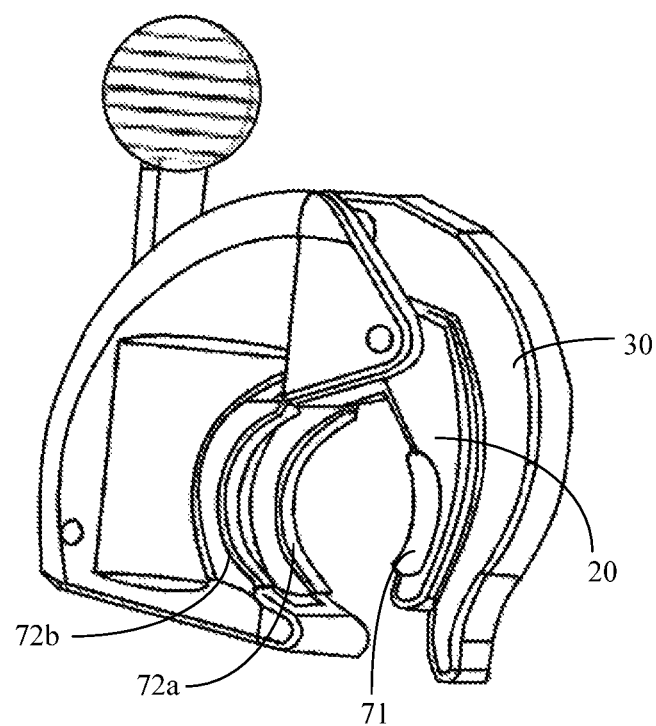
FIG. 3 is a rear perspective view of the clamping device for handlebar.
Figure 4:
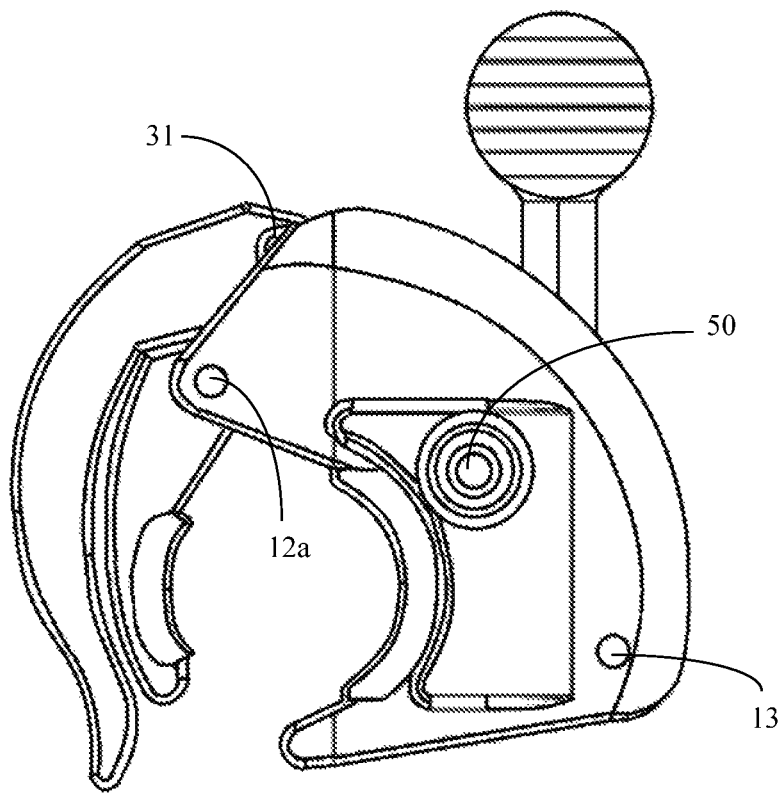
FIG. 4 is a front view of the clamping device for handlebar.
Figure 5:
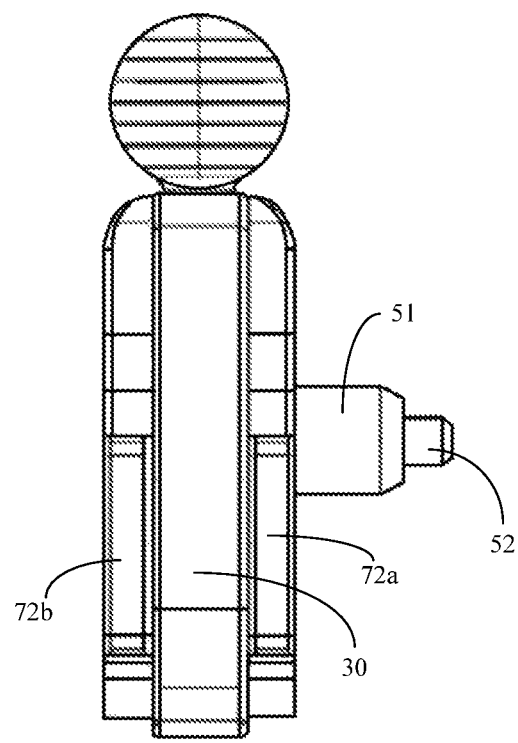
FIG. 5 is a side view of the clamping device for handlebar.

With reference to FIGS. 1 to 7, in a preferred embodiment, the clamping device for handlebar mainly includes a clamping base 10, a clamping arm 20, a locking arm 40 and a support component 60, and preferably includes a holding arm 30 and a locking assembly 50.

Figure 6:
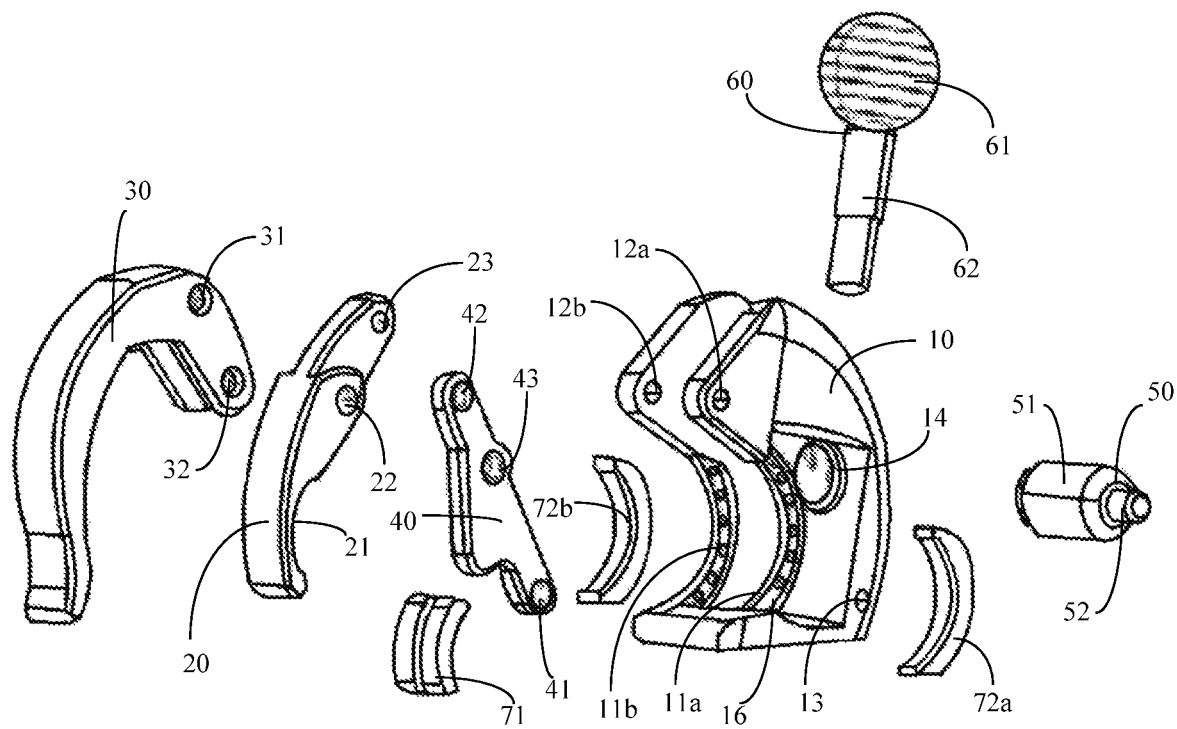
FIG. 6 is an exploded view of the clamping device for handlebar.
Figure 7:
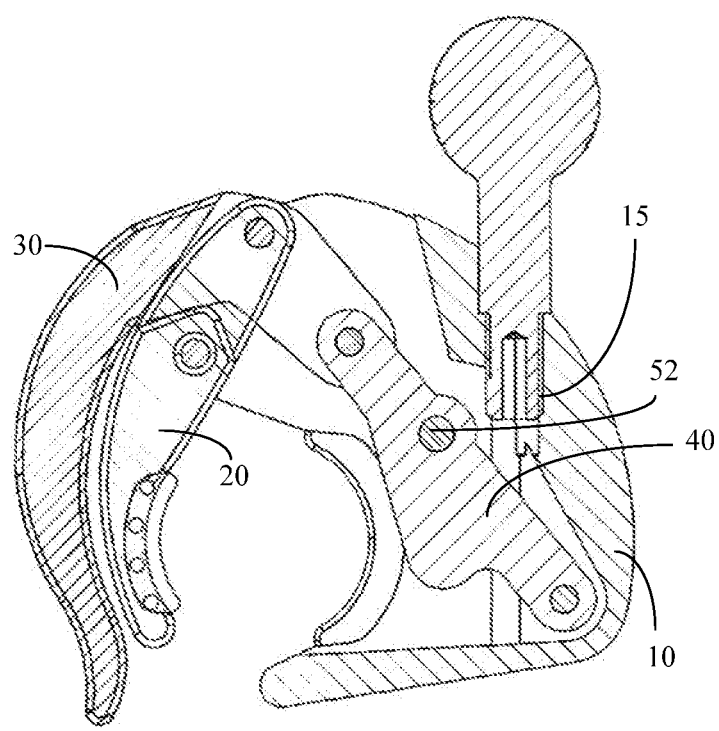
FIG. 7 is a sectional view of the clamping device for handlebar.

As best shown in FIG. 6, the clamping base 10 includes a cavity and has first clamping surface 11a, 11b. The clamping base 10 is provided with a first base connecting part 12a, 12b for pivotally connecting the clamping arm 20, and a second base connecting part 13 for pivotally connecting the locking arm 40. In addition, the clamping base is also provided with a third base connecting part 14 for mounting the locking assembly 50, and a fourth base connecting part 15 (FIG. 7) for the support component 60 to be inserted and fixed.

The clamping arm 20 is provided with a clamping section having a second clamping surface 21 thereon, which can be combined with the first clamping surfaces to form an arc-shaped clamping part clamped on the handlebar. In the illustrated embodiment, the clamping arm 20 is provided with a first clamping connecting part 22 for pivotally connecting the first base connecting part 12a, 12b on the clamping base 10, and a second clamping connecting part 23 is extended from the first clamping connecting part 22 to be pivotally connected to the holding arm 30.

Preferably, the first clamping surfaces 11a, 11b and the second clamping surface 21 are respectively provided with anti-skid components, such as the anti-skid components 72a, 72b on the first clamping surfaces and the anti-skid component 71 on the second clamping surface 21. The anti-skid components are made of rubber and attached to the first clamping surfaces and the second clamping surface through the adhesive and/or clip groove. As an example, FIG. 6 shows a clip groove 15 formed on the first clamping surfaces 11a, 11b. Some structures or components for holding the anti-skid components can be preferably provided in the clip groove, including but not limited to T shaped grooves, clamping protrusions, etc.

The holding arm 30 is used for the users to carry out clamping and releasing operations. In the illustrated embodiment, the holding arm 30 includes the handle part, a first holding connecting part 31 for pivotally connecting the clamp arm 20 and a second holding connecting part 32 for pivotally connecting the locking arm 40.

The locking arm 40 is accommodated in the cavity of the clamping base 10, one end of which is provided with a first locking connecting part 41 to be pivotally connected to the second base connecting part 13 on the clamping base 10, and the other end is provided with a second locking connecting part 42 to be pivotally connected to the second holding connecting part 32 of the holding arm 30. Preferably, a plurality of locking holes can be arranged on the locking arm 40 to adapt to the handlebars having different diameters, and a locking hole 43 is illustrated in FIG. 6 as an example. The locking hole 43 can be combined with the locking assembly to carry out the clamping and releasing of the handlebar.

The locking assembly 50 includes a locking seat 51 mounted on the clamping base 10 and a locking pin 52, wherein the locking seat 51 can be provided with a threaded part capable of connecting to the third base connecting part 14 on the clamping base 10, and the locking pin 52 is capable of moving back and forth between the locked position and the unlocked position along the perforation on the locking seat 51. In a preferred embodiment, the locking assembly comprises an elastic element, such as a spring sleeved on the locking pin 52. In this way, in the locked position, the locking pin 52 is accommodated and locked in the locking seat 51, and can pass through the locking hole 43 of the locking arm 40. When the unlocked position is located, the locking pin 52 is elastically restored to protrude out from the locking seat 51. In some embodiments, the locking pin 52 can be configured to be locked by pressing, and can be elastically restored by pressing again. In some embodiments, the locking pin 52 can be unlocked by means of an unlocking component after being locked, for example, by inserting and rotating a key shaped to follow with the locking pin so as to unlock it. When the unlocking component is adopted, the clamping device of is especially benefit for theft prevention.

In the illustration embodiment, the shown support component 60 has a spherical support part 61 for supporting a navigation device or a camera, and a connecting part 62 mounted on the fourth base connecting part 15 of the clamping base 10, for example, via thread connection. The spherical support part 61 can also be configured as other structures which are capable of holding a mobile phone and so on. Advantageously, the connecting part 62 can also be configured as a universal part that can be adapted to various smart devices.

The clamping device is preferably made of cast aluminum or aluminum alloy, and its surface can also be coated with color or chrome plated or black anodized to meet the requirements of different customers.

The invention claimed is:

1. A clamping device for a handlebar, including:
 a clamping base comprising a cavity and a first clamping surface;
 a clamping arm pivotally connected to the clamping base and having a second clamping surface;
 a locking arm arranged in the cavity and pivotally connected with the clamping base, the locking arm being connected with the clamping arm and being provided with at least one locking hole;
 a locking assembly mounted on the clamping base, the locking assembly comprising a locking pin, the clamping device being in a locked state when the locking pin is inserted into the locking hole; and
 a support component detachably mounted on the clamping base for fixing smart equipment.

2. The clamping device for a handlebar according to claim 1, further comprising a holding arm pivotally connected with the clamping arm and the locking arm.

3. The clamping device for a handlebar according to claim 2, wherein the locking assembly comprises a locking seat mounted on the clamping base, the locking pin being capable of moving back and forth between a locked position and an unlocked position along the perforation on the locking seat.

4. The clamping device for a handlebar according to claim 3, wherein the locking assembly comprises an elastic element, the locking pin being accommodated and locked in the locking seat and being capable of passing through the locking hole on the locking arm in the locked position, the locking pin being elastically restored to protrude out from the locking seat in the unlocked position.

5. The clamping device for a handlebar according to claim 4, wherein the locking pin is unlocked by means of an unlocked component.

6. The clamping device for a handlebar according to claim 1, wherein the first clamping surface and the second clamping surface are respectively provided with anti-skid components, the anti-skid components being attached to the first clamping surface and to the second clamping surface by adhesive and/or clip groove.

7. The clamping device for a handlebar according to claim 6, wherein the anti-skid components are made of rubber.

8. The clamping device for a handlebar according to claim 1, wherein the support component is configured to hold a mobile phone, navigation system or action camera.

9. The clamping device for a handlebar according to claim 1, wherein the clamping device is made of cast aluminum or aluminum alloy.

10. The clamping device for a handlebar according to claim 9, wherein the surface of the clamping device is coated with color, chrome plated or black anodized.

11. The clamping device for a handlebar according to claim 2, wherein the first clamping surface and the second clamping surface are respectively provided with anti-skid components, the anti-skid components being attached to the first clamping surface and to the second clamping surface by adhesive and/or clip groove.

12. The clamping device for a handlebar according to claim 2, wherein the support component is configured to hold a mobile phone, navigation system or action camera.

13. The clamping device for a handlebar according to claim 3, wherein the clamping device is made of cast aluminum or aluminum alloy.

14. A clamping device for a handlebar, including:
  a clamping base comprising a cavity and a first clamping surface;
  a clamping arm pivotally connected to the clamping base and having a second clamping surface;
  a locking arm arranged in the cavity and pivotally connected with the clamping base, the locking arm being connected with the clamping arm and being provided with at least one locking hole;
  a holding arm pivotally connected with the clamping arm and the locking arm;
  a locking assembly mounted on the clamping base, the locking assembly comprising a locking pin; and
  an equipment support component detachably mounted on the clamping base.

15. The clamping device for a handlebar according to claim 14, wherein the locking assembly comprises a locking seat mounted on the clamping base, the locking seat including a perforation, the locking pin being capable of moving back and forth between a locked position and an unlocked position along the perforation on the locking seat.

16. The clamping device for a handlebar according to claim 15, wherein the locking assembly comprises an elastic element, the locking pin being accommodated and locked in the locking seat and being capable of passing through the locking hole on the locking arm in the locked position, the locking pin being elastically restored to protrude out from the locking seat in the unlocked position.

17. The clamping device for a handlebar according to claim 16, further including an unlocked component and wherein the locking pin is unlocked by means of the unlocked component.

18. A clamping device for a handlebar, including:
  a clamping base comprising a cavity and a first clamping surface;
  a clamping arm pivotally connected to the clamping base and having a second clamping surface;
  a locking arm arranged in the cavity and pivotally connected with the clamping base, the locking arm being connected with the clamping arm and being provided with at least one locking hole;
  a locking assembly mounted on the clamping base, the locking assembly comprising a locking pin, the clamping device being in a locked state when the locking pin is inserted into the locking hole, the locking assembly comprising a locking seat mounted on the clamping base, the locking pin being capable of reversibly moving between a first direction and a second direction, the first direction being opposite the second direction; and
  an equipment support component detachably mounted on the clamping base.

19. The clamping device for a handlebar according to claim 18, further comprising a holding arm pivotally connected with the clamping arm and the locking arm.

20. The clamping device for a handlebar according to claim 19, wherein the locking assembly comprises an elastic element, the locking pin being accommodated and locked in the locking seat and being capable of passing through the locking hole on the locking arm in the locked position, the locking pin being elastically restored to protrude out from the locking seat in the unlocked position.

* * * * *